(12) United States Patent
Chen et al.

(10) Patent No.: US 8,590,793 B2
(45) Date of Patent: Nov. 26, 2013

(54) IMAGING-BASED BARCODE READERS HAVING CURVED WINDOW

(75) Inventors: Caihua (Lucy) Chen, Hauppauge, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 49 days.

(21) Appl. No.: 13/306,510

(22) Filed: Nov. 29, 2011

(65) Prior Publication Data

US 2012/0160919 A1 Jun. 28, 2012

Related U.S. Application Data

(60) Provisional application No. 61/426,012, filed on Dec. 22, 2010.

(51) Int. Cl.
*G06K 7/10* (2006.01)

(52) U.S. Cl.
USPC .................................................. 235/462.06

(58) Field of Classification Search
USPC .................................................. 235/462.06
See application file for complete search history.

(56) References Cited

U.S. PATENT DOCUMENTS 5,572,007 A * 11/1996 Aragon et al. ........... 235/462.35
2008/0296388 A1* 12/2008 Drzymala et al. ....... 235/462.42

* cited by examiner

*Primary Examiner* — Jamara Franklin
(74) *Attorney, Agent, or Firm* — Nong-Qiang Fan

(57) ABSTRACT

An apparatus operative to decode a barcode on a target object includes a mirror located within the housing at a position generally facing both the curved window and the imaging lens arrangement of the scan engine. The curved window is configured to operate together with the mirror to direct any of the illumination light reflected by the curved window away from the imaging lens arrangement to avoid the detrimental hot spots in the image.

19 Claims, 8 Drawing Sheets

# IMAGING-BASED BARCODE READERS HAVING CURVED WINDOW

RELATED APPLICATIONS

The present application claims benefit under 35 U.S.C. §119(e) from U.S. Provisional Patent Application Ser. No. 61/426,012, filed Dec. 22, 2010, titled "METHOD OF INTEGRATING ENGINE, FOLDING MIRROR AND EXIT WINDOW IN IMAGING SCANNER FOR AVOIDING STRAY LIGHT FROM ILLUMINATING SOURCE".

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

FIG. 1A and FIG. 1B depict an imaging scanner 50 in accordance with some embodiments. The imaging scanner 50 has a window 56 and a housing 58. The imaging scanner 50 is typically a portable reader that has a base for supporting itself on a flat surface 30, such as, a countertop. The window 56 generally faces an operator at the workstation. As shown in FIG. 1A, the operator can slide or swipe the product 40 past the window 56 from right to left, or from left to right, in a "swipe" mode, to let an image of the barcode 40 on the product 42 be captured by the imaging scanner 50. Alternatively, the operator can present the barcode 40 on the product 42 to the center of the window 56 in a "presentation" mode. The choice depends on operator preference or on the layout of the workstation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
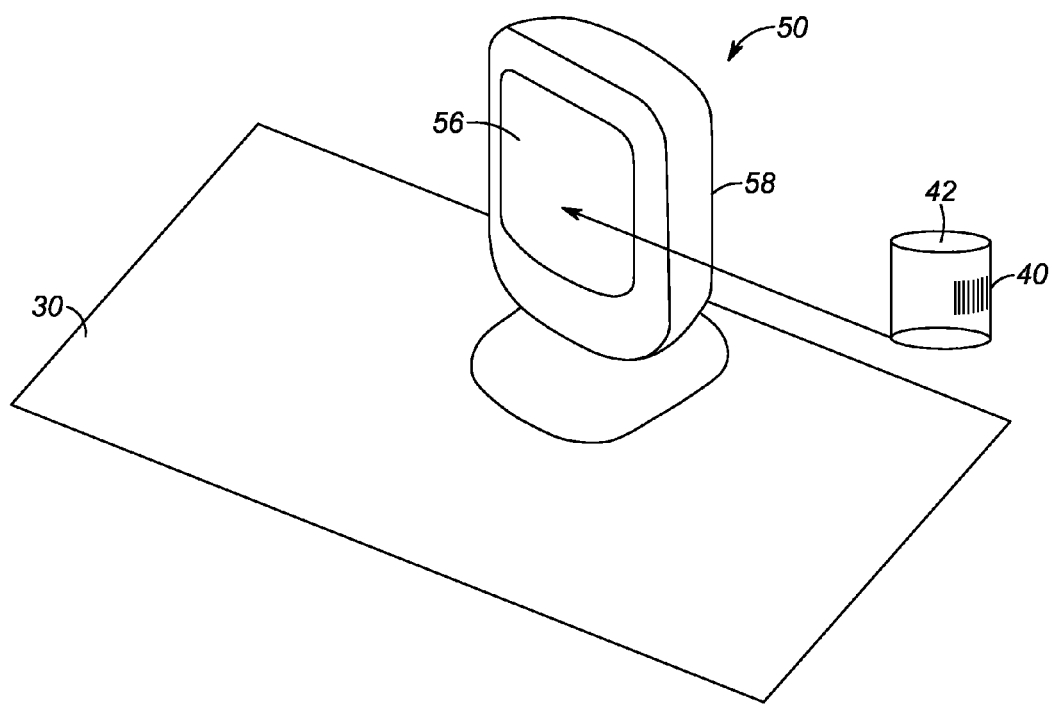
FIG. 1A and FIG. 1B depict an imaging scanner in accordance with some embodiments.
Figure 1B:
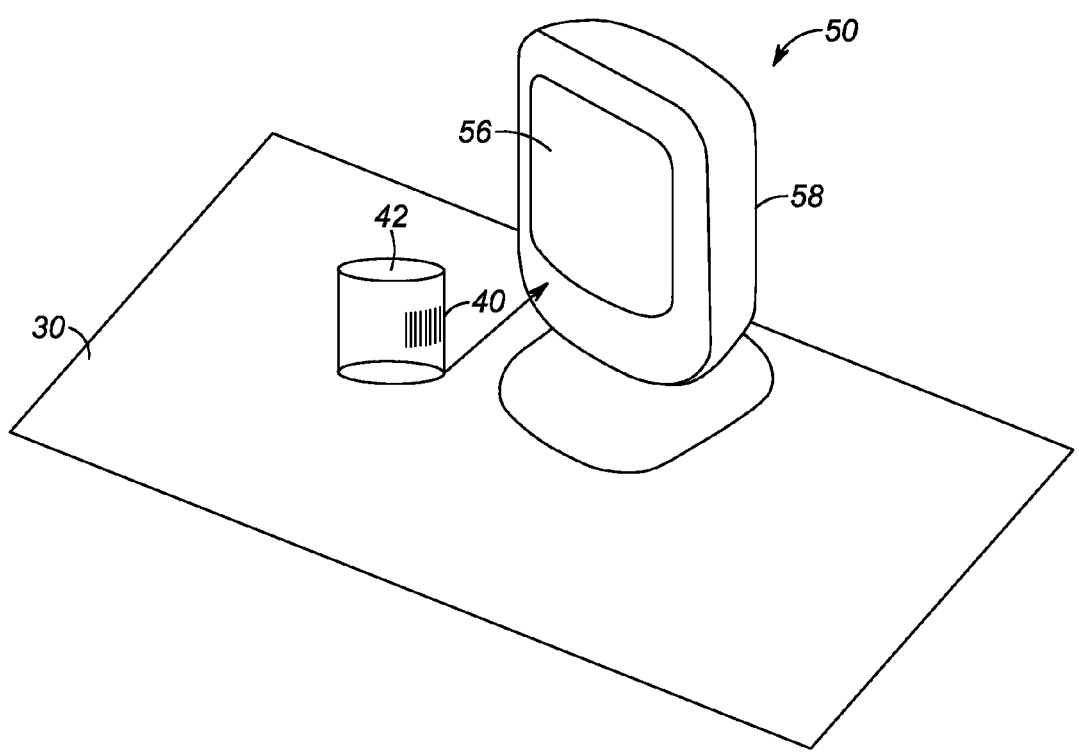

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
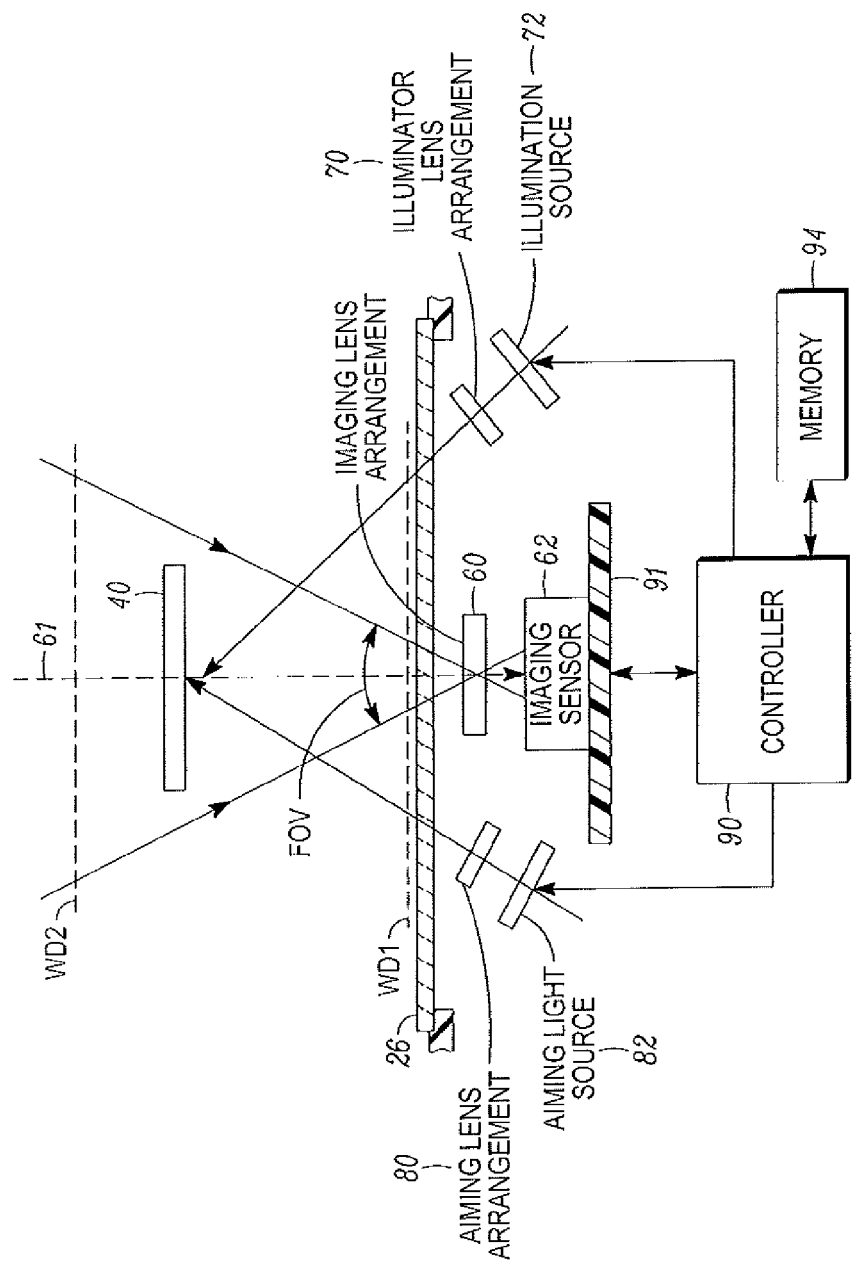
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, imaging lens arrangement 60 projects scattered or reflected light from the object of interests 40 onto the imaging sensor 62 within a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the object of interest 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then activates the exposure of the imaging sensor 62 to capture an image of the object of interest 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3:
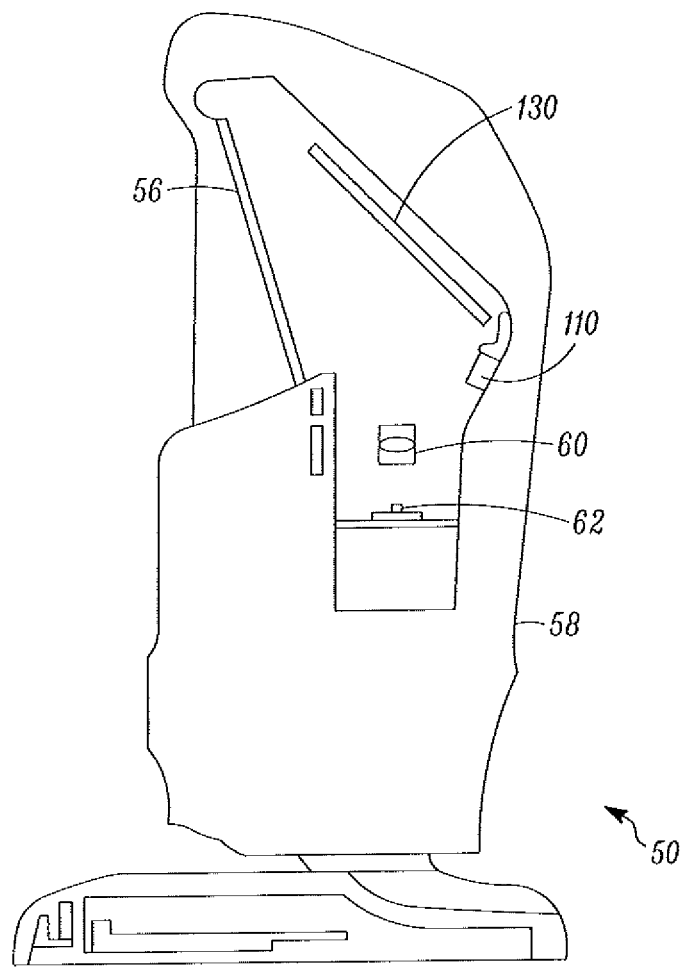
FIG. 3 shows an imaging scanner that applies a folding mirror to reduce the system physical length while meeting the optical path for needed performance.

With emerging applications such as mobile coupons, digital loyalty, mobile ticketing, age verification and auto population of forms, imager based scanners are becoming increasingly important. In many such applications, a compact device is required due to user's favor of non-fatigue grip and the limitation of application spaces such as on counter top. To achieve the required compactness, as shown in FIG. 3, the imaging scanner 50 typically applies a folding mirror 130 to reduce the system physical depth while meeting the optical path for needed performance. The challenge in this implementation is that an imaging scanner mostly needs a protective housing 58 with an exit window 56 to protect it from the external environment and also internal illuminating source(s) to allow it acquiring images/reading barcodes under low ambient light conditions, for example in a poorly illuminated warehouse or at the very back of a delivery truck. The problem is that if the illuminating source(s) is(are) is integrated in the same embodiment of the scan engine in the close proximity to the imaging lens 60 or anywhere before the folding mirror and the exit window, the light from the illumination system can find a way back to the imaging lens 60 of the engine and get projected onto the imaging sensor by this means forming undesired hot spots within the imaging FOV. Say it the other way the illuminating light bounces back and forth between the mirror and the exit window and creates hot spots (stray light) within the field of view (FOV) of the imaging system which is over imposed on the image of the object of interest 40.

Figure 4:
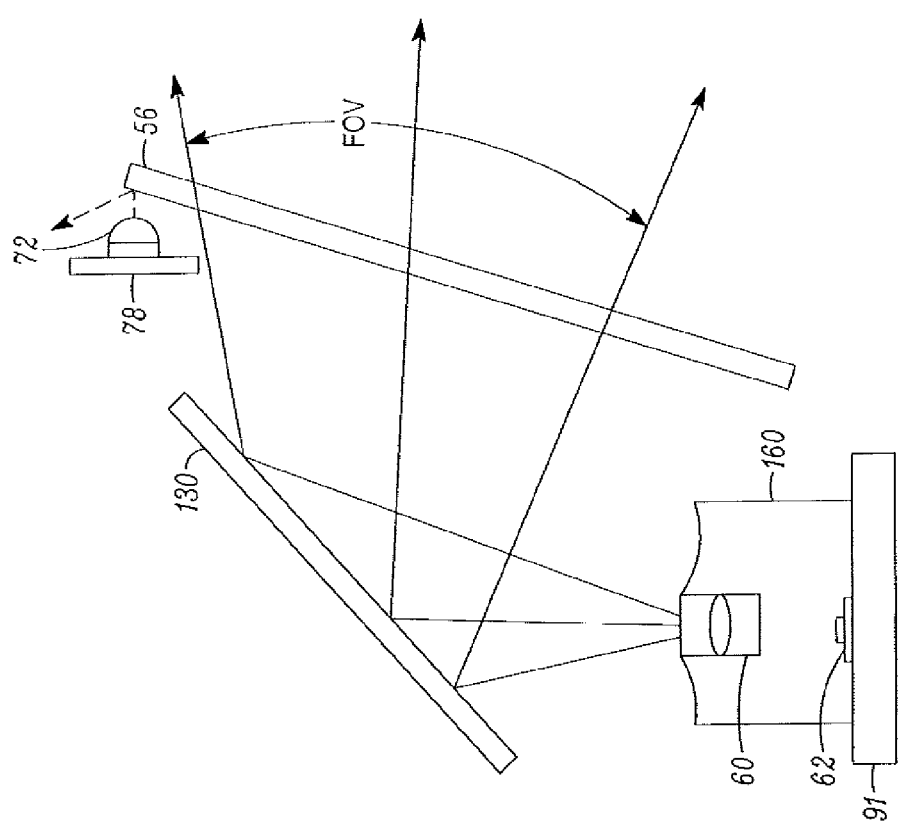
FIG. 4 shows an imaging scanner having its illuminating source positioned after the mirror and right in front of the exit window.

To solve this problem, one known way is to place the illuminating source(s) 72 after the mirror and right in front of the exit window outside the imaging FOV such that the reflection of illuminating light from the exit window does not find its way bouncing back and forth between the mirror and the exit window and eventually back to the engine image lens, as shown in FIG. 4.

There are two disadvantages of this approach. First, the illumination source 72 is separated far from the imaging lens 60 and the scan engine 160. Another PCB 78 in addition to the image sensor PCB 91 is therefore required for driving illumination sources, which not only adds additional cost to the scanner but also would potentially make the device bigger and more complicated. Second, in this approach the illumination FOV has large parallax to the image FOV. The illumination FOV therefore has to be significantly bigger than the imaging FOV, which requires significant illumination power to provide adequate signal for acquiring images and reading barcodes. For this reason, the implementation of this approach normally has a substantial number of sets of LEDs, which is another factor of significant additional cost. In addition in this arrangement the light source is easily seen by the user, which can be perceived by the user as bothersome.

Figure 5:
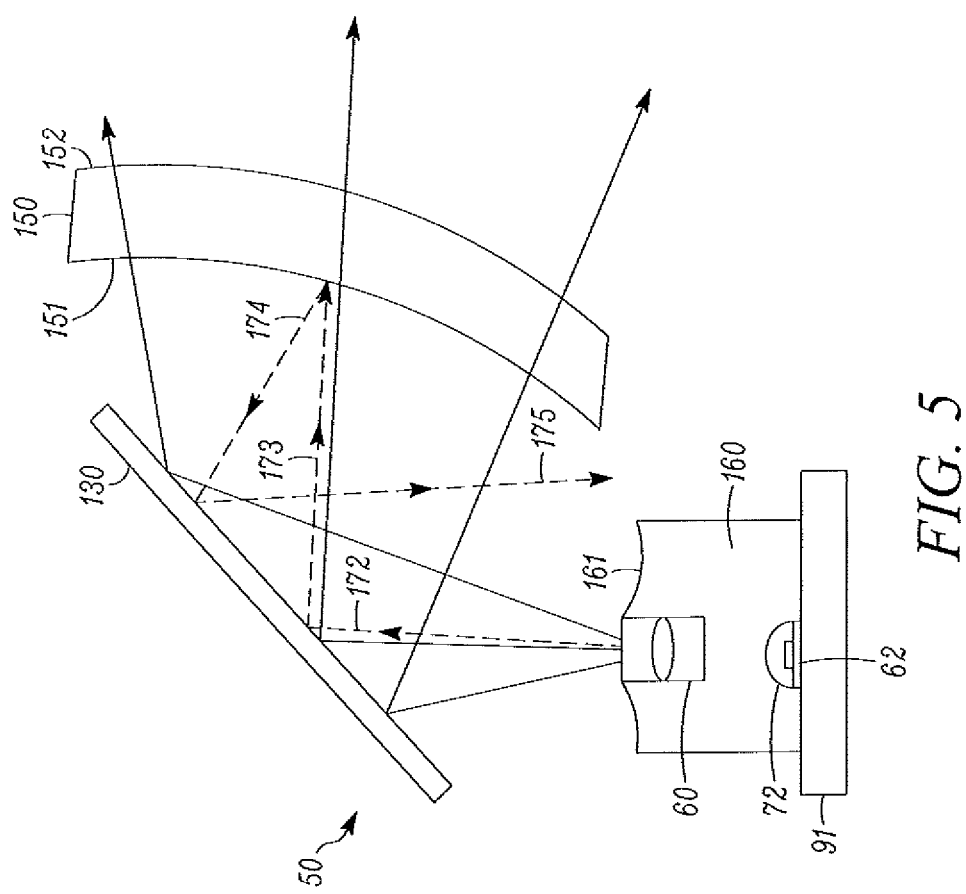
FIGS. 5 and 6 depict an imaging scanner in which the shape and the position of the exit window is configured to direct stray light away from the imaging lens arrangement of the imaging scanner.
Figure 6:
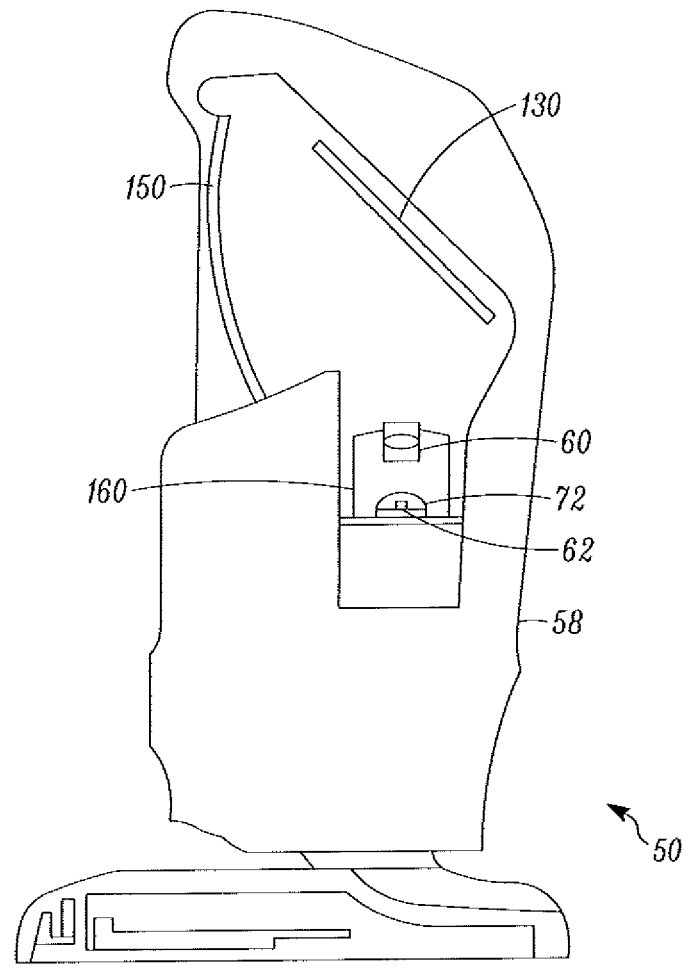

FIGS. 5 and 6 depict an imaging scanner 50 in which the shape and the position the exit window 150 is configured in such a way to prevent the illuminating light get reflected by the exit window 152 onto the imaging lens 60. The illuminating light is reflected in a controlled manner in the area 175 outside the imaging lens arrangement 60 and therefore is not projected by the imaging lens onto the sensor. The imaging scanner 50 includes a housing 58, a curved window 150 attaching to the housing 58, and a scan engine 160 located inside the housing 58. The scan engine 160 includes a printed circuit board (PCB) 91, a chassis cover 161 that overlies the printed circuit board 91, and an imaging lens arrangement 60 held in place by the chassis cover 161. The scan engine 160 also includes an imaging sensor 62, an illumination source 72, and a controller, all mounted on the PCB 91. The imaging sensor 62 is positioned behind the imaging lens arrangement 60. The illumination source 72 is positioned at a location near the imaging sensor 62 for providing an illumination light to illuminate the target object outside the curved window 150. The controller on the PCB can be used to control both the illumination source 72 and the imaging sensor 62.

The imaging scanner 50 also includes a mirror 130 located within the housing 58 at a position generally facing both the curved window 150 and the imaging lens arrangement 60 of the scan engine 160. The curved window 150 is configured to operate together with the mirror 130 to direct any of the illumination light reflected by the curved window 150 away from the imaging lens arrangement 60. For example, as shown in FIG. 5, light 172 emitted from the illumination source 72 is reflected by the mirror 130 as illumination light 173. The illumination light 173, after reflected by the curved window 150, becomes stray light 174, which is reflected by the mirror 130 and directed away from the imaging lens arrangement 60 as stray light 175. Because stray light 174 and 175 do not enter the imaging lens arrangement 60 and they are not captured by the imaging sensor 62, hot spots within the field of view (FOV) of the imaging sensor 62 due to stray light are avoided.

Figure 7:
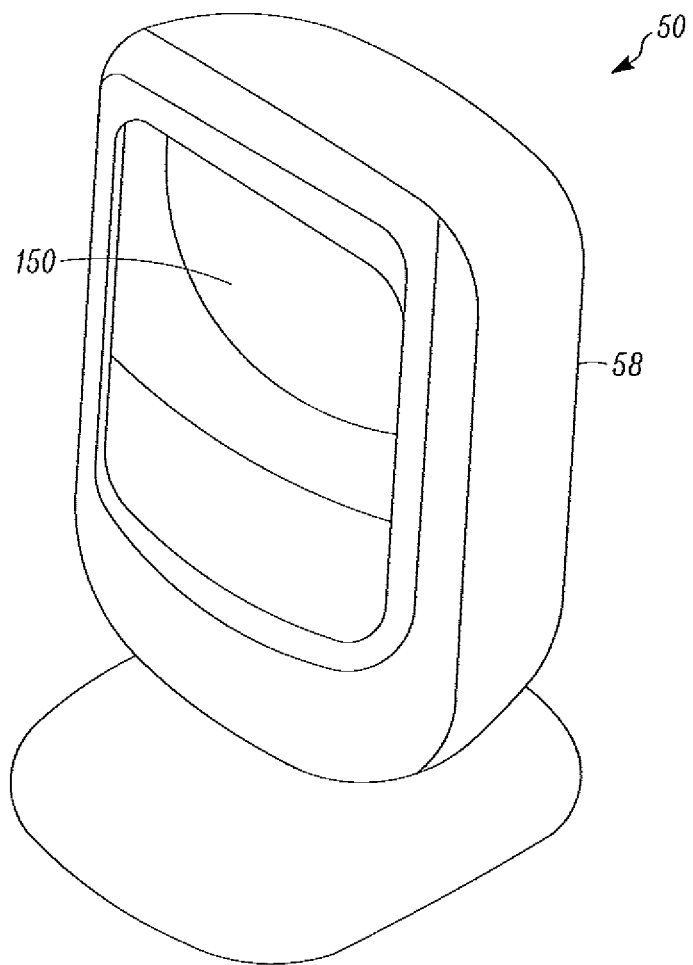
FIG. 7 shows an imaging scanner having a curved window.

There are many ways to implement such a window 150. The curved window generally has substantially no significant optical power. One embodiment is to use the regular cylindrical or spherical shape, window tilt, and window decenter as variables to control the stray light direction. FIG. 7 shows one embodiment of the window 150 from outside of the imaging scanner 50. Another embodiment is to use a complex shape to flexibly control the stray light. In some of these embodiments, the front and back surfaces 151 and 152 may need to be parallel such that the introduction of the shaped exit window does not add additional power to the transmitted image wavefront to degrade the image quality. The curved window 150 has a convex surface facing away from the imaging lens arrangement 60. In a preferred embodiment the window 150 is predominantly spherical shape however aspherical, cylindrical, or any others free shape figures are also possible. The window has substantially no optical power however in some other embodiments the window may have minor optical power as long as the reflection from the internal and external surfaces of the window do not reach the imaging lens arrangement 60. The proposed idea has many advantages compared to the above mentioned known way to solve the expressed problem in Section 3 in the development of compact and cost-effective imager-based scanners. First, it allows a single PCB integrating all necessary functions including the image sensor and illumination LEDs and their control circuitries, which not only significantly saves the cost but also helps to reduce the needed space and thus allows a better compactness of the device. Second, it allows the minimum parallax between the image FOV and illumination FOV, which therefore gives more flexibility for an efficient illumination design with much less cost and power consumption.

In the foregoing specification, specific embodiments have been described. However, one of ordinary skill in the art appreciates that various modifications and changes can be made without departing from the scope of the invention as set forth in the claims below. For example, in some embodiments, the illumination source 72 does not share the imaging lens arrangement 60 with the imaging sensor 62. That is, the illumination source 72 may be mounted on the PCB and positioned behind a separate illumination lens arrangement. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An apparatus operative to decode a barcode on a target object comprising:
  a housing;
  a curved window attaching to the housing;
  a scan engine located inside the housing, wherein the scan engine comprises,
    (1) a printed circuit board (PCB),
    (2) a chassis cover that overlies the printed circuit board,
    (3) an imaging lens arrangement held in place by the chassis cover,

(4) an imaging sensor mounted on the PCB and positioned behind the imaging lens arrangement, the imaging sensor having an array of photosensitive elements for capturing an image of the target object, (5) an illumination source mounted on the PCB at a location near the imaging sensor for providing an illumination light to illuminate the target object outside the curved window, and (6) a controller mounted on the PCB to control both the illumination source and the imaging sensor, and wherein the imaging lens arrangement, the imaging sensor, and the illumination source are all rigidly held together by the PCB and the chassis cover;

a mirror located within the housing at a position generally facing both the curved window and the imaging lens arrangement of the scan engine; and wherein the curved window with substantially no optical power is configured to operate together with the mirror to direct any of the illumination light reflected by the curved window away from the imaging lens arrangement.

2. The apparatus of claim 1, wherein the curved window has an inner surface and an outer surface that is substantially parallel to the inner surface.

3. The apparatus of claim 1, wherein the curved window includes a section having cylindrical shape.

4. The apparatus of claim 1, wherein the curved window includes a section having substantially spherical shape.

5. The apparatus of claim 1, wherein the curved window includes a section having an aspherical shape.

6. The apparatus of claim 1, wherein the curved window includes a section having a free form shape.

7. The apparatus of claim 1, wherein the curved window includes a section having a convex shape.

8. The apparatus of claim 1, wherein the curved window includes a section having a concave shape.

9. The apparatus of claim 1, wherein:
the scan engine further comprises an illumination lens arrangement held in place by the chassis cover; and
the scan engine is configured to have the illumination source positioned behind the illumination lens arrangement for providing the illumination light.

10. The apparatus of claim 1, wherein:
the scan engine is configured to have the illumination source positioned behind the imaging lens arrangement for providing the illumination light.

11. The apparatus of claim 1, wherein the curved window is configured to operate together with the mirror to direct any of the illumination light reflected by the curved window away from both the imaging lens arrangement and the chassis cover.

12. A method of operating a barcode reader to decode a barcode on a target object, the barcode reader includes a scan engine located inside a housing, wherein the scan engine comprises, (1) a printed circuit board (PCB), (2) a chassis cover that overlies the printed circuit board, (3) an imaging lens arrangement held in place by the chassis cover, (4) an imaging sensor mounted on the PCB and positioned behind the imaging lens arrangement, the imaging sensor having an array of photosensitive elements, (5) an illumination source mounted on the PCB at a location near the imaging sensor for providing an illumination light, and (6) a controller mounted on the PCB to control both the illumination source and the imaging sensor , and wherein the imaging lens arrangement, the imaging sensor, and the illumination source are all rigidly held together by the PCB and the chassis cover, the method comprising:

reflecting illumination light generated by the illumination source in the scan engine towards a curved window attached to the housing for providing illumination directed toward the target object positioned outside the curved window, wherein the curved window with substantially no optical power is configured to direct any of the illumination light reflected by the curved window away from the imaging lens arrangement in the scan engine to avoid the detrimental hot spots in image captured by the imaging sensor;

capturing an image from the target object with the imaging sensor in the scan engine while the target object is illuminated by the illumination originated from the illumination source in the scan engine.

13. The method of claim 12, wherein the curved window has an inner surface and an outer surface that is parallel to the inner surface.

14. The method of claim 12, wherein the curved window includes a section having a cylindrical shape.

15. The method of claim 12, wherein the curved window includes a section having a spherical shape.

16. The method of claim 12, wherein the curved window includes a section having an aspherical shape.

17. The method of claim 12, wherein the curved window includes a section having a free form shape.

18. The method of claim 12, wherein the curved window includes a section having a convex shape.

19. The method of claim 12, wherein the curved window includes a section having a concave shape.

* * * * *